United States Patent [19]

Fujisawa et al.

[11] 4,027,345

[45] June 7, 1977

[54] TRANSFER PRINTING

[75] Inventors: Michio Fujisawa; Hatsuo Matsumoto; Shuzo Sawada; Kiyoshi Yamane, all of Otsu; Hideo Kato, Kashiwara; Takayuki Shimizu, Habikino; Shigeo Kato, Kashiwara, all of Japan

[73] Assignee: Toyo Boseki Kabushiki Kaisha, Osaka, Japan

[22] Filed: June 12, 1975

[21] Appl. No.: 586,281

[30] Foreign Application Priority Data

June 14, 1974 Japan .............................. 49-68439

[52] U.S. Cl. ................................ 8/2.5 R; 8/2.5 A; 101/470; 106/26; 106/30; 106/178; 156/234; 156/240; 156/277; 260/23 R; 260/406; 260/407; 427/148; 427/152; 427/154; 428/913; 428/914

[51] Int. Cl.² ...................... D06P 5/00; C08L 1/32; C08L 91/00

[58] Field of Search ................ 8/2.5; 427/148, 149, 427/152, 154; 428/913, 914; 156/234, 238, 240, 230, 277, 155; 260/406, 413, 407, 17 R, 23 R, 32.2; 106/171, 178, 26, 30; 101/470, 471

[56] References Cited

UNITED STATES PATENTS

| | | | |
|---|---|---|---|
| 2,469,059 | 5/1949 | Turk | 260/406 |
| 2,685,549 | 8/1954 | Wooldrik | 428/914 |
| 2,911,280 | 11/1959 | Cicogna | 8/2.5 X |
| 3,897,469 | 7/1975 | Stein et al. | 260/413 |
| 3,918,895 | 11/1975 | Mizuno | 427/152 |

*Primary Examiner*—William A. Powell
*Assistant Examiner*—Thomas Bokan
*Attorney, Agent, or Firm*—Wenderoth, Lind & Ponack

[57] ABSTRACT

A method of transfer printing, wherein a release layer is formed on a temporary support; printing a pattern on said release layer with an ink containing coloring matter therein to obtain a transfer sheet; superposing an article to be transfer-printed on the printed surface of said transfer sheet; heating the superposed aggregate under pressure to transfer the release layer with the pattern onto said article to be transfer-printed; fixing the coloring matter to said article, and then soaping said article to remove the release layer, characterized in that the release layer consists of (1) 10–90 wt. percent of one or more thermoplastic polymers having excellent film-forming properties and water-solubility or alkaline water solubility as well as organic solvent solubility and (2) 90 to 10 wt. percent of one or more plasticizers having a melting point between 30° and 120° C selected from oxycarboxylic acids or their derivatives having water solubility or alkaline water solubility as well as organic solvent solubility.

12 Claims, 2 Drawing Figures

TRANSFER PRINTING

Figure 1:
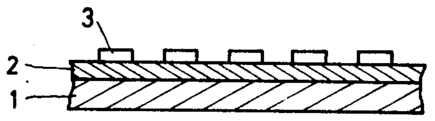

The present invention relates to a method of transfer printing for a textile article or a sheet-shaped article. More particularly, the invention relates to a method of transfer printing which comprises forming a release layer on a temporary support; printing a pattern on said release layer with an ink containing a coloring matter to obtain a transfer sheet; superposing the textile article or the sheet-shaped article on the printed surface of said transfer sheet; heating the superposed aggregate under pressure to transfer the pattern onto said textile article or sheet-shaped article; fixing the coloring matter and then washing said article.

Among the transfer printing methods for textile goods, the so-called dry transfer printing method is widely known from, for example, U.S. Pat. No. 3,363,557 and French Pat. No. 1,223,330, in which a textile fabric is placed on a transfer sheet composed of a temporary support, such as paper, printed with an ink containing a sublimable dye. Such a method, however, is limited to the use of sublimable dyes, so the fabrics to be printed are limited to fabrics having a high degree of thermal resistance, such as polyesters, acetates, etc. In addition, the method has disadvantages in that the printed article is poor in fastness to sublimation and has a stiff hand, and only the surface layer of the fabric can be dyed.

On the other hand, there are several known methods of transfer printing for textile goods, such as cotton, wool, nylon, acrylic fibers, silk, etc., wherein non-sublimable dyes are used. An example of such method comprises forming a release layer composed of a thermoplastic resin, such as polyethylene, polyvinyl acetate, polyvinyl chloride, polyacrylic acid esters, rubbers, etc., on a temporary support; printing a transfer pattern on said release layer with an ink containing a dye to obtain a transfer sheet; superposing a fabric on said transfer sheet; heating the superposed aggregate under pressure to soften the release layer resin and transfer the pattern onto the fabric together with the release layer resin; and then fixing the dye. Thus, this method comprises softening the release layer resin by heat to make it into a fluid form and separating the pattern within this layer from the temporary support to transfer the pattern onto the fabric. Since the softening is reversible with heating, the release must be effected rapidly while the release layer is still in a semi-fluid state, or otherwise the temporary support and the fabric will again be intimately fixed to each other this makes the separation impossible or produces nonuniform and unstable transference. To solve this problem, heat transfer at a higher temperature is required, but such heat transfer will cause a thermal change on the fabric itself. Thus, thermoplastic synthetic fiber products will become stiff, and natural fiber products, will yellow and become lower in strength. The printed products thus obtained are poor in commercial value. Further, since the release layer resin having moved to the fiber product upon the transferring process is water-insoluble, it cannot be removed by ordinary water washing or soaping. Such fiber products, therefore, have disadvantages in that the air permeability is lowered or the hand becomes stiff. The water-insoluble resin can, of course, be removed by washing with special solvents, but this may cause staining with unfixed dye that has come off.

On the other hand, water-soluble resins such as British gum, sodium alginate, starch, methyl cellulose, etc. can be removed by soaping and will not make the hand stiff. But these water-soluble resins are not thermoplastic, so they cannot be used as a release layer of the heat transfer sheet.

Besides these methods, there are known from Japanese patent publication Nos. 21447/1970 and 22094/1970, transfer printing methods using, as the release layer, hard resins such as rosin, rosin esters, alkyd resins, petroleum resins and phenol resins. There are also known transfer printing methods using waxes such as paraffin waxes, microcrystal waxes, polyethylene glycol, etc. However, these methods have various drawbacks. For example, during the printing process the ink is repelled on the release layer composed of any of the above-mentioned hard resins or waxes thereby making the printing bad. Contrarily, the ink passes through the release layer and deep into the temporary support thereby lowering the transfer efficiency of the dye onto the article to be transfer-printed or making the printed pattern edges unclear. Also, because of poor solvent stripping from the printed layer, the drying is liable to be insufficient, thereby tending to cause blocking during storage. Further, because the above-mentioned hard resins or waxes are of comparatively low molecular weight and thus poor in film-forming properties, picking or embossing of the release layer is caused during printing. The printed transfer sheet is liable to crack with the result that the printed pattern is cracked or deformed. Furthermore, because of the low smoothness of the release layer surface, the printed appearance, particularly of highlighted portions, is poor. In addition, particularly in the case of low melting point resins such as waxes and rosin, they are melted or softened at the drying temperature in the printing machine, so that the guide rolls are soiled, which does not allow for production of a clear pattern. Moreover, removal of the hard resins or waxes that have moved to the fiber products during transfer printing is difficult by the usual water washing or soaping. A special washing process or organic solvent washing process is therefore required. Also, the hard resins or waxes and unfixed dyes that have been removed during the washing process cause a re-soiling. To remedy these defects, methods are known wherein a mixture of a wax and a thermoplastic polyethylene or a vinyl resin which is compatible with the wax is used as the release layer (Japanese patent publication No. 2367/1972) or wherein a wax obtained by the oxidation of a polyethylene is used as the release layer (U.S. Pat. No. 2,862,832). These methods, as compared with the above-mentioned conventional methods, have some effects on improving the penetration of ink, the deformation of the printed surface and the cracking and blocking, but no improvement has been made with respect to resin removal. Namely, because these resins are water-insoluble, the resins that have moved to the fiber products cannot be removed by the usual water washing or soaping. Accordingly, the air permeability of the printed products is lowered and the hand becomes stiff. Besides, part of the resin and unfixed dye removed during washing adhere to the product and cause soiling. Thus, these methods still cannot remedy the defects of the printed products to be used as articles of commerce.

An object of the present invention is to transfer-print a sharp, delicate, photograph-like pattern on textile goods, particularly knitted fabrics, woven fabrics, non-woven fabrics, and spun-bonded fabrics, composed of all sorts of fiber materials such as natural fibers, regenerated fibers, semi-synthetic fibers, synthetic fibers, and on sheet-shaped articles, particularly films, tapes and leathers, composed of cellulose acetate, polyamides, polyesters, polyolefins, polyurethanes, etc.

Another object of the present invention is to perform printing which does not make the fabric stiff even for fibers having low thermal resistance, such as acrylic, nylon, silk, etc. fibers. Fast printing which does not cause deterioration of mechanical properties or yellowing, by performing transfer-printing effectively at a low temperature and low pressure is also desired.

A further object of the present invention is to provide, at a low cost, a clear printed product free from re-soiling without impairing hand and air permeability, because after the fixing treatment of the coloring matter, the release layer composition and ink binder are removed by the usual water-washing or soaping without requiring a special washing process.

These and other objects and advantages of the invention will become apparent from the description of the specification that follows.

We made an intensive study to remedy the above-mentioned defects of the conventional methods. As a result, we achieved the transfer printing method of the present invention which uses an entirely new release layer. The present invention is a transfer printing method which comprises forming a release layer on a temporary support; printing a pattern on said release layer with an ink containing a coloring matter to obtain a transfer sheet; superposing an article to be transfer-printed on the printed surface of said transfer sheet; heating the superposed aggregate under pressure to transfer the pattern on the transfer sheet onto said article to be transfer-printed; fixing the coloring matter to said article and then washing the article. The release layer consists of 10 to 90 weight percent of one or more water-soluble or alkaline-water-soluble and organic-solvent-soluble thermoplastic polymers having excellent film-forming properties and 90 to 10 weight percent of one or more plasticizers having a melting point between 30° and 120° C. selected from water-soluble or alkaline-water-soluble and organic-solvent-soluble oxy-carboxylic acids or their derivatives.

Thus, the most important feature of the method of the present invention is to use, as the release layer, a mixture of at least one thermoplastic polymer (A) having excellent film-forming properties which is water-soluble or alkaline-water-soluble and organic-solvent-soluble, and at least one plasticizer (B) having a melting point between 30° and 120° C., selected from oxy-carboxylic acids or their derivatives which are water-soluble or alkaline-water-soluble and organic-solvent-soluble. Because the thermoplastic polymer (A) has excellent film-forming properties, such defects as the penetration of ink into the release layer during pattern printing, the bleeding and deformation of printed patterns, the cracking and blocking during storage of the printed transfer sheets, the soiling of guide rollers in the printing machine, etc. are eliminated. Also, good smoothness of the release layer surface enables delicate, fine printing at highlighted portions which is, a characteristic feature of transfer printing. Because of the excellent film-forming properties of the thermoplastic polymer, there is no fear that the pattern may be deformed in the fixing treatment of the coloring matter after transferring. Further, because the release layer of the present invention is a combination of the thermoplastic polymer (A) and the plasticizer (B) having a plasticizing effect on the former, it is possible to stably transfer the pattern on the transfer sheet onto the article to be transfer-printed under comparatively low temperature and pressure conditions in a uniform manner and at a high transfer efficiency. In addition, because both the release layer composed of components (A) and (B) are water-soluble or alkaline-water-soluble, the release layer composition moved by transferring to the article to be transfer-printed can be easily and completely eliminated by the usual water-washing or soaping or alkaline soaping. Further, the fact that the release layer components (A) and (B) are organic-solvent-soluble, besides being water-soluble or alkaline-water-soluble, is quite advantageous. That is, because a coating liquid dissolved in an organic solvent medium can be prepared, even if the temporary support is paper, there will be no lowering of smoothness by swelling or deformation of the design by contraction, as may occur when using an aqueous medium. It is possible, therefore, to produce a transfer sheet which is excellent in printing properties and good in pattern fitting. Further, the use of an organic solvent as the medium enables short time drying and high speed production of transfer sheets.

Another marked feature is the facility of preparing the coating liquid. The release layer component (A) has a high solubility in organic solvents of high polarity, for example, alcoholic solvents such as methyl alcohol, ethyl alcohol, isopropyl alcohol; ketonic solvents such as acetone, methyl ethyl ketone, methyl isobutyl ketone; methyl cellosolve, dimethylformamide, etc. On the other hand, the release layer component (B), because of the hydroxyl group in the molecule, has good compatibility with the above-mentioned organic solvents and is easily dissolved therein. Accordingly, a uniform and highly concentrated coating liquid can be obtained using the same organic solvent. Further, the coating liquid does not separate into layers during storage or during the coating operation, and stable, uniform coating can be effected. Furthermore, component (B) of the release layer of the present invention causes the phenomenon of layer separation or migration gradually, with the passage of time, during storage and suitably rises to the printed surface. This property is quite effective in preventing blocking which often occurs during the storage of rolled-up transfer sheets. In addition, the release layer of the present invention can be not only easily removed by water-washing or soaping or alkaline soaping, but does not readhere after it has been once removed. Besides, the component (A) prevents textile goods from being stained by the removed unfixed coloring matter, so that clear printed textile goods can be produced.

As mentioned above, the method of the present invention has numerous features, as compared with the conventional methods, and its merit in efficiency and economy is great.

The present invention will be more fully understood from the following description which will be made by referring partly to the annexed drawings. In the drawings, FIG. 1 is a schematic cross-section of the transfer sheet of the present invention.

Figure 2:
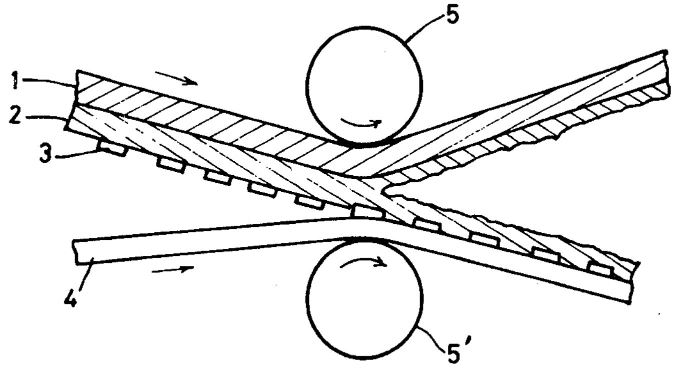

FIG. 2 is an explanatory diagram illustrating the mechanism of the transfer process in which the transfer sheet of the present invention and the article to be transfer-printed are superposed on each other and heated with hot rolls under pressure to perform transfer printing.

In FIG. 1, temporary support 1 is coated with a release layer composition composed of the thermoplastic polymer (A) and plasticizer (B) to form release layer 2. On release layer 2, design or pattern 3 is printed. As shown in FIG. 2, the transfer sheet thus obtained and the article 4 to be transfer-printed are superposed on each other, with the printed-surface of the transfer sheet in contact with the article 4. The superposed assembly is then inserted between or passed through hot plates or hot rolls 5 and 5' under heat and pressure, whereby release layer 2 is softened and transferred together with design 3 onto the article to be transfer-printed 4. Usually only the upper roll 5 is heated while the lower roll 5' is not heated.

Among the materials for the temporary support 1, which is the substrate for the transfer sheet of the present invention, there may be mentioned various sorts of papers such as glassine paper, copy paper, craft paper; films formed of viscose, acetate, polyesters, polyamides, polyolefins; metallic foils such as aluminum foil; sheet-shaped articles having smooth surfaces like a plain weave fabric, produced by laminating synthetic paper and film, etc., although papers and films are preferred.

Among the thermoplastic polymers having excellent film-forming properties which are water-soluble or alkaline-water-soluble and organic-solvent soluble, used as a component of the release layer composition formed on the temporary support, there may be mentioned; cellulose derivatives, e.g. hydroxy lower alkyl ethers of cellulose such as hydroxyethyl cellulose, hydroxypropyl cellulose, hydroxyethyl-hydroxypropyl cellulose; hydroxy lower alkyl-lower alkyl mixed ethers of cellulose such as hydroxyethyl-methyl cellulose, hydroxypropyl-methyl cellulose, hydroxyethyl-hydroxypropylmethyl cellulose, hydroxyethyl-ethyl cellulose, hydroxypropyl-ethyl cellulose; derivatives of cyanoethyl cellulose such as cyanoethyl-hydroxyethyl cellulose, cyanoethyl-hydroxypropyl cellulose, cyanoethyl-methyl cellulose, partially hydrolyzed products of cyanoethyl cellulose; cellulose ether-esters such as methyl cellulose acetate, methyl cellulose phthalate, hydroxyethyl cellulose acetate, hydroxyethyl cellulose phthalate, hydroxypropyl cellulose acetate, hydroxypropyl cellulose phthalate, hydroxyethyl-methyl cellulose phthalate; various vinyl copolymers consisting of an ethylenically unsaturated mono- or dicarboxylic acid (such as acrylic acid, methacrylic acid, maleic acid, fumaric acid) and another ethylenically unsaturated monomer copolymerizable therewith (such as acrylic acid ester, methacrylic acid ester, acrylonitrile, vinyl acetate, vinyl propionate, vinyl chloride, acrylamide). The copolymerization ratio of the ethylenically unsaturated mono- or dicarboxylic acid and the other monomer copolymerizable therewith varies depending on the type of the unsaturated carboxylic acid to be used and the other component to be copolymerized. Generally, the unsaturated carboxylic acid is 5–20 mol percent and the copolymerizable component is 95–80 mol percent. More of the copolymers thus obtained are water-insoluble but are alkaline-water-soluble polymers which, when the free acid groups are neutralized with alkali, becomes water-soluble. Among the above-mentioned cellulose derivatives and vinyl copolymers, particularly preferred are hydroxypropyl cellulose, hydroxypropyl-hydroxyethyl cellulose, hydroxypropyl cellulose phthalate, hydroxypropylmethyl cellulose phthalate, and copolymers composed of 10–15 mol percent of acrylic acid and/or methacrylic acid and 90–85 mol percent of a copolymerizable ethylenically unsaturated monomer consisting mainly of acrylic acid ester and/or methacrylic acid ester. Preferably, the above-mentioned thermoplastic polymers generally have a softening point between 60° and 200° C. Polymers having a softening point below 60° C. are sticky and therefore transfer sheets containing such polymers in the form of rolls are liable to cause blocking during storage. On the other hand, polymers having a softening point above 200° C. require higher temperature because such polymers have low power of transfer.

As the plasticizers having a melting point between 30° and 120° C. which are water-soluble or alkaline-water-soluble and organic-solvent-soluble, selected from oxycarboxylic acids or their derivatives, there are exemplified compounds represented by the general formula:

$$(HO)_n-R_1-COOR_2$$

wherein $R_1$ is a straight-chained or branched aliphatic hydrocarbon residue having 3 or more carbon atoms, preferably 5 to 21 carbon atoms, or aromatic hydrocarbon residue; $R_2$ is hydrogen or an alkyl group having 1 to 4 carbon atoms; and *n* is a positive integer from 1 to 3. More concrete examples of preferred plasticizers are: monoxy fatty acids such as hydroxystearic acid, hydroxytetradecanoic acid, hydroxycaproic acid, hydroxydocosanoic acid; dioxy fatty acids such as 2,10-dioxy-tridecanoic acid, 3,11-dioxy-tetradecanoic acid, 2,15-dioxy-pentadecanoic acid, 15,16-dioxy-hexadecanoic acid; trioxy fatty acids such as 8,9,10-trioxy-hexadecanoic acid, 9,10,16-trioxy-hexadecanoic acid; oxybenzoic acid esters such as oxybenzoic acid-n-ethyl, -n-propyl, -n-butyl esters, etc. Oxycarboxylic acids or their derivatives having a melting point below 30° C. are tacky and liable to block although they have a large plasticizing effect. On the other hand, oxycarboxylic acids or their derivatives having a melting point above 120° C. are small in plasticizing effect and poor in transfer efficiency and have low solubility in organic solvents. Thus both are unsuitable. It is desirable that the $R_1$ of the oxy fatty acids or their derivatives in the above-mentioned general formula be above 5 in the number of carbon atoms. Where paper is used as the temporary support, because a plasticizer having a small number of carbon atoms has a high affinity for paper, it penetrates deeply into the paper during the storage of transfer sheets and seriously lowers the power of transfer. Among the above-mentioned plasticizers, particularly preferred are oxy fatty acids having a melting point between 50° and 100° C. and having $R_1$ above 5 in the number of carbon atoms. Such oxy fatty acids include 12-hydroxystearic acid (m.p. 78° C.), 2-hydroxypalmitic acid (m.p. 93.5° C.), 11-hydroxypalmitic acid (m.p. 65.5° C.), 14-hydroxypalmitic acid (m.p. 72.8° C.), 16-hydroxypalmitic acid (m.p. 95° C.), ω-hydroxylauric acid (m.p. 84°C.), 2-hydroxydodecanoic acid (m.p. 78.5° C.), 2-hydroxytetradecanoic acid (m.p. 88.5° C.), 11-hydroxytetradecanoic acid (m.p. 51°–2° C.), 3,11-dihydroxytetradecanoic acid (m.p. 68° C.), 9,10-dihydroxyundecanoic acid (m.p. 82°–3° C.), etc. Among these, 12-hydroxystearic acid, 11-hydroxypalmitic acid and ω-hydroxylauric acid are particularly preferable.

The release layer composition in the present invention consists essentially of a mixture of 10–90 weight percent of the above-mentioned thermoplastic polymer and 90–10 weight percent of the above-mentioned plasticizer. A small amount of a certain kind of additive such as a filler, siccative or other resins may be properly added within the range in which the objects of the present invention are not obstructed. With the amount of addition of the plasticizer less than 10 weight percent, the plasticizing effect is low and the power of transfer is poor. Inversely, where the amount of addition is above 90 weight percent, the design bleeds into the release layer and hinders sharp printing at pattern edges. In addition, contamination of the ink bath, lowering of smoothness of the coated surface, etc. are caused. A more preferable ratio of compounding of the release layer composition is 30–90 weight percent of the above-mentioned thermoplastic polymer and 70–10 weight percent of the above-mentioned plasticizer. Additionally, it is preferable that the release layer of the present invention have a melting point normally between 50° and 150° C., particularly between 70° and 120° C.

In the present invention, one or more kinds of the above-mentioned plasticizers and one or more kinds of the above-mentioned thermoplastic polymers, dissolved in an organic solvent, are coated on the temporary support by means of a gravure coater or roll coater and then dried to form the release layer. Where the temporary support to be used is paper having a comparatively rough surface, a resin such as polyvinyl alcohol, sodium alginate, carboxymethyl cellulose, styrene-butadiene copolymer, etc. may be coated on the surface before the formation of the release layer to fill the roughness or to give smoothness so that the coating efficiency of the release layer composition can be increased and the printing and transferring efficiencies can be promoted. The amount of coating of the release layer composition depends on the kind of temporary support and the composition of the release layer composition to be used, through it is normally 0.5–15 g/m$^2$, preferably 2–5 g/m$^2$ in dry amount of coating.

In the next step, a pattern to be transferred is printed on the release layer. The pattern may be printed by any of the usual planographic, relief, intaglio or stencil printing methods or may be hand-drawn. The printing inks to be used are not particularly limited but, as for the ink binders, it is preferable to use a water-soluble or alkaline-water-soluble and organic-solvent-soluble thermoplastic polymer which is the same as used for the release layer composition. The coloring matter to be used for the ink is not also particularly limited, and any one may be used that has an affinity to the article to be transfer-printed. For example, the coloring matter is selected from various dyes such as acid dyes, acid mordant dyes, basic dyes, cationic dyes, direct dyes, naphthol dyes, vat dyes, sulfur dyes, reactive dyes, disperse dyes, etc. depending on the material of the article to be transfer-printed. In chemical structure, they are azo dyes, anthraquinone dyes, indigoid or thioindigoid dyes, diphenylmethane or triphenylmethane dyes, phthalocyanine dyes, nitro dyes, thiazol dyes, xanthene dyes, acridine dyes, azine dyes, oxazine dyes, thiazine dyes, or cyanine dyes, etc. If required, an overcoating layer may be further formed on the design with a water-soluble or alkaline-water-soluble polymer.

The transfer sheet thus obtained is normally rolled up, and then introduced to the transfer printing process or stored. In the transfer printing process, the printed surface of the transfer sheet and the article to be transfer-printed are placed on each other so that the printed surface of the transfer sheet contacts the surface of the article. The superposed assembly is then heated under pressure by means of calender rolls or hot plates normally at a temperature between 80° and 180° C., preferably between 100° and 150° C., instantaneously or for a short time. The design on the transfer sheet, together with the release layer, is transferred onto the article to be transfer-printed. Where the transfer sheet of the present invention is used, the transference is accomplished instantaneously under heat and pressure by hot calender rolls at a temperature between 80° and 180° C., preferably between 100° and 150° C. at a pressure between 1 and 100 kg/cm$^2$, preferably between 10 and 50 kg/cm, with the transfer efficiency attaining above 90%. Therefore, this enables continuous transference and provides great industrial and economical advantages. In the case of heat and pressure by means of a hot plate press at a temperature between 100° and 150° C. at a pressure between 0.2 and 5 kg/cm$^2$, the transfer efficiency of the printing layer attains above 90%.

After the transference, the temporary support is separated. With the transfer sheet of the present invention, the separation is extremely easy. The temporary support, upon coming out of the hot rolls or upon being removed from the hot plates, can be separated without applying any force. This extreme smoothness and ease of separation is one of the marked features of the transfer sheet of the present invention, with the result that uniform and stable transference can be performed. After the transference, the printed article is subjected to fixing treatment by the usual saturated steam heat, superheated steam heat or dry heat, depending on the kind of the article to be transfer-printed and the kind of the coloring matter to be used, to fix the coloring matter and to develop color. Thereafter, by soaping or reducing washing, unfixed portions of the coloring matter, ink binder and release layer composition are dissolved and removed. In this way, there is obtained a fast-dyed printed product which is deep in color and sharp at pattern edges.

As articles to be transfer-printed to which the method of the present invention is applicable, there may be mentioned textile goods such as yarns, cords, woven fabrics, knitted fabrics, non-woven fabrics, spun-bonded fabrics, carpets or rugs, etc., composed of natural fibers such as cotton, hemp, silk, wool; regenerated fibers such as rayon, polynosic; semi-synthetic fibers such as acetate; protein-mixed fibers such as protein-acrylonitrile graft copolymer fibers; synthetic fibers such as polyamide, polyester, polyacrylonitrile, polychlal, polyurethane, polypropylene fibers and mixtures of these fibers, and sheet-shaped articles such as films, boards, tapes, synthetic papers, leathers, etc. formed of resin such as acetate, polyesters, polyolefins, polyurethanes, etc.

By the method of the present invention, an extremely clear transfer sheet, sharp at pattern edges and having a photograph-like multicolored pattern, can be obtained by forming a release layer of a specified composition. The release layer has an appropriate affinity to the ink (an affinity of the degree that does not repel the ink but does not lower the dyeability) and has an excellent aptitude for printing (good in film-forming properties and exempted from ink bleeding, deformation and cracking of the design and soiling of the printing machine). In addition, the release layer has an appropriate degree of adhesion to the support (the release layer is not separated during handling but is easily separated under mild transfer conditions and does not cause blocking during storage) and has an appropriate softening temperature (the release layer has a thermoplasticity to intimately adhere to the article to be transfer-printed but does not flow to deform the design at the time of coloring matter fixation). By applying the release layer particularly to articles to be transfer-printed having low thermal resistance, excellent printed products can be obtained which are not impaired in hand and mechanical properties. Accordingly, the release layer of the present invention is suitable for the printing of acrylic, polyamide, and silk fabrics which are sensitive to temperature and pressure. In addition, the release layer composition and ink binder used in the present invention can be dissolved and removed by the simple soaping after the fixing treatment of the coloring matter, so that printed products not impaired in hand and air permeability can be obtained at low cost. Further, because the thermoplastic polymer used in the release layer and ink binder acts as suspending agent for the coloring matter, the trouble of staining by the unfixed dye removed in the soaping process can be obviated. Accordingly, quality printed products which are clear and fast can be produced.

The present invention will be explained by examples hereunder, but the invention is not limited by the description of the examples, wherein all parts are by weight.

EXAMPLE 1

The following release layer composition (a) was coated uniformly on a glassine paper by a gravure coater so that the dry amount of coating was 2.5 g/m$^2$, and was then dried.

| (a) Release layer composition | |
|---|---|
| Hydroxypropyl cellulose (HPC-SL, Nippon Soda Co., Ltd.) | 13 parts |
| 12-Hydroxystearic acid | 7 parts |
| Methanol | 40 parts |
| Toluene | 40 parts |

Subsequently, a pattern to be transferred was gravure-printed on the release layer with the following printing ink (b).

| (b) Printing ink | |
|---|---|
| Sumikaron Red E-FBL Conc. (Sumitomo Chemical Co., Ltd.; C.I. Disperse Red 60) | 7 parts |
| Copolymer of ethyl acrylate/methyl acrylate/acrylic acid (50/30/12 mol %) | 15 parts |
| Toluene | 30 parts |
| Methyl ethyl ketone | 30 parts |
| Isopropanol | 18 parts |

A polyester fabric suede was placed on the printed surface and was passed between calender rolls heated to 130° C. under a pressure of 30 kg/cm at the rate of 5 m/min. Upon leaving the calender, the glassine paper of the support had been already separated. The transfer efficiency of the ink (dye) was about 90%. The transfer-printed fabric was then steamed at 130° C. for 30 minutes for dye fixation and color development. Thereafter, the fabric was subjected to reducing washing at 70° C. for 20 minutes with an aqueous solution composed of 2 g/l sodium hydroxide, 2 g/l sodium hydrosulfite and 2 g/l Amylasin (a detergent; Dai-ichi Kogyo Seiyaku Co., Ltd.) to dissolve and remove unfixed dye, the release layer and ink binder and then washed with water and dried. As a result, there was obtained a printed product having a photograph-like design and an excellent touch and which was sharp at pattern edges. Additionally, in a comparative example by a transfer sheet using only hydroxypropyl cellulose as the release layer, the transfer efficiency was below 30%. In another comparative example using 12-hydroxystearic acid singly, in addition to a difficulty in the pattern printing in preparing the transfer sheet, deformation of the pattern occurred upon transferring, so that no practicable one was obtained.

EXAMPLE 2

The following release layer composition (c) was coated uniformly on a cellophane film with a gravure coater so that the dry amount of coating was 3 g/m$^2$, and was then dried.

| (c) Release layer composition | |
|---|---|
| Copolymer of ethyl acrylate/methyl methacrylate/acrylic acid (50/38/12 mol %) | 10 parts |
| 11-Hydroxypalmitic acid | 10 parts |
| Toluene | 20 parts |
| Isopropanol | 20 parts |
| Methyl ethyl ketone | 40 parts |

A pattern was then gravure-printed on the release layer with the following ink (d).

| (d) Printing ink | |
|---|---|
| Sumiacryl Brilliant Red N-4G Conc. (Sumitomo Chemical Co., Ltd.; C.I. Basic Red 14) | 5 parts |
| Rosin modified alkyd resin (Malkyd 30 A; Arakawa Rinsan Co.) | 20 parts |
| Methanol | 20 parts |
| Isopropanol | 55 parts |

On the printed surface of the transfer sheet thus obtained, a knitted fabric composed of an acrylic fiber (Exlan$^R$; Japan Exlan Co. Ltd.) was placed and was heat-pressed at a pressure of 5 kg/cm$^2$ with a plate press heated to 105° C. for 10 seconds. Thereafter, the cellophane film was removed and the pattern was transferred onto the knitted fabric. The transfer efficiency of the ink (dye) was about 90%. Subsequently, the transfer-printed fabric was steamed at 110° C. for 20 minutes for dye fixation and color development. Thereafter, the fabic was soaped with an aqueous solution composed of 2 g/l chip soap and 2 g/l sodium carbonate at 60° C. for 10 minutes to dissolve and remove unfixed dye, the release layer and ink binder. The fabric was then washed and dried. There was obtained a printed product on which the pattern with sharp edges was reproduced and which had an excellent hand.

EXAMPLE 3

The following release layer composition (e) was coated on a polyethylene terephthalate film (polyester film produced by Toyo Boseki Kabushiki Kaisha, 25 μ in thickness) with a gravure coater so that the dry amount of coating was 3 g/m², and was then dried.

| (e) Release layer composition | |
|---|---|
| Hydroxypropyl-methyl cellulose phthalate (HP-50; Shin-etsu Chemical Co., Ltd.) | 10 parts |
| ω-Hydroxylauric acid | 10 parts |
| Methanol | 60 parts |
| Isopropanol | 20 parts |

Subsequently, a pattern was printed on the release layer with the following printing ink (f) by the gravure method and then the ink was dried.

| (f) Printing ink | |
|---|---|
| Suminol Fast Blue-PR Conc. (Sumitomo Chemical Company Limited; C.I. Acid Blue 129) | 10 parts |
| Copolymer of ethyl acrylate/methyl methacrylate/acrylic acid (50/38/12 mol %) | 15 parts |
| Isopropanol | 30 parts |
| Methyl ethyl ketone | 30 parts |
| Toluene | 15 parts |

A nylon crepon produced by Toyo Boseki Kabushiki Kaisha was placed on the printed surface of the thus obtained transfer sheet and was passed between calender rolls heated to 100° C. at a pressure of 30 kg/cm² at the rate of 5 m/min. Thereafter, the polyester film was separated and removed. The transfer efficiency of the ink (dye) was about 100%. The transfer-printed fabric was then steamed at 105° C. for 30 minutes to fix the dye and to develop color. The fabric was then soaped with an aqueous solution composed of 2 g/l sodium carbonate and 5 g/l Marseilles soap at 70° C. for 10 minutes to dissolve and remove unfixed dye, the release layer and ink binder. The fabric was then washed with water and dried. A printed cloth which was sharp at pattern edges and had a good hand was obtained.

EXAMPLE 4

A 5% aqueous solution of polyvinyl alcohol (Gosenol NH-20; Nippon Synthetic Chemical Industry Co., Ltd.) was coated with a gravure coater on a copy paper so that the dry amount of coating was 0.5 g/m², and then dried and passed between heated calender rolls to obtain a sized paper of excellent smoothness. On this paper, the same release layer composition (a) as in Example 1 was coated so that the dry amount of coating was 2.5 g/m² and was dried. A pattern was offset-printed on this release layer using the following printing ink (g) and the printed ink was dried.

| (g) Printing ink | |
|---|---|
| Sumifix Brilliant Red BS Conc. (Sumitomo Chemical Company Limited; C.I. Reactive Red 111) | 10 parts |
| Hydroxypropyl cellulose | 5 parts |
| Rosin-modified maleic acid resin (Malkyd 30 A; Arakawa Rinsan Co.) | 10 parts |
| Isopropanol | 30 parts |
| Toluene | 30 parts |
| Ethyl acetate | 15 parts |

A cotton poplin which had been impregnated with the following treating liquid (h) (squeezed to a wet pick-up of 70%) and dried, was placed on the printed surface of thus obtained transfer sheet, and was passed between calender rolls heated to 150° C. at a pressure of 30 kg/cm² at the rate of 5 m/min. At the outlet of the calender rolls, the temporary support (copy paper) had been already separated. The transference was performed extremely unformly and smoothly. The transfer efficiency of the ink (dye) reached as high as 95%.

| (h) Treating liquid | |
|---|---|
| Sodium alginate | 5 parts |
| Sodium bicarbonate | 3 parts |
| Urea | 5 parts |
| Water | 87 parts |

This transfer-printed cloth was then steamed at 100° C. for 10 minutes to fix the dye and to develop color. Thereafter, the cloth was soaped with an aqueous solution composed of 2 g/l sodium carbonate and 5 g/l Marseilles soap at 80° C. for 10 minutes to dissolve and remove unfixed dye, the ink binder and the release layer, and was then washed with water and dried. There was obtained a clear deep-colored printed cloth having sharp pattern edges.

EXAMPLE 5

| (i) Release layer composition (present invention) | |
|---|---|
| Hydroxypropyl cellulose | 12 parts |
| 12-Hydroxystearic acid | 12 parts |
| Metanol 40 parts | |
| Isopropanol | 16 parts |
| Toluene | 20 parts |
| (j) Printing ink composition | |
| Disperse dye (Sumitomo Chemical Company Limited) | 7 parts |
| Yellow ink: Sumikaron Yellow SE:5G conc. (C.I. Disperse Yellow 5) | |
| Red ink: Sumikaron Red S-BL Conc. (C.I. Disperse Red 88) | |
| Blue ink: Sumikaron Blue S-BG Conc. (C.I. Diserse Blue 73) | |
| Hydroxypropyl cellulose | 5 parts |
| Rosin-modified maleic acid resin (Malkyd 32; Arakawa Rinsan Co.) | 10 parts |
| Isopropanol | 50 parts |
| Toluene | 15 parts |
| Ethyl acetate | 13 parts |

On a copy paper which had been surface-sized with polyvinyl alcohol (Gosenol NH-20; Japan Synthetic Chemical Industry Co.) and hot calender-finished, release layer formation and three-color printing were performed continously by a four-color gravure printing machine, using the above-mentioned release layer composition (i) and the three-color printing inks shown in (j) to prepare a transfer sheet. During the printing process, pollution of the guide rolls of the printing machine, deformation of the pattern and picking did not occur to allow excellent printing which was sharp at pattern edges and had a good printing effect at highlight portions. The transfer sheets, after storage for 6 months at room temperatures in the form of rolls, did no show any blocking phenomenon. A polyester texturized yarn fabric was placed on the printed surface of this transfer sheet and was passed between calender rolls heated to 130° C. under the conditions of 30 kg/cm$^2$ and 5 m/min. Upon leaving the calender, the copy paper and the polyester cloth had been already separated from each other. The transfer efficiency of the ink was about 90%. After the transfer-printed cloth was then steamed at 130° C. for 30 minutes for dye fixation and color development, it was subjected to reducing washing treatment as in Example 1 to dissolved and remove unfixed dyes and the release layer and ink binder, and then washed with water and dried. There was obtained a printed product which was sharp at pattern edges and splendid in tones and which was not impaired in hand.

In addition, a comparative experiment between the method of the present invention and conventional methods was carried out as follows: As the support, the above-mentioned polyvinyl alcohol-sized paper was used. On the surface of this paper, coating and three color printing were performed continuously by a four-color gravure printing machine, using the following conventional release layer compositions (k to o) and the above-mentioned three color inks shown in (j), to prepare transfer sheets.

| Release layer compositions (comparative examples) | | |
|---|---|---|
| (k) | Rosin ester (Ester Gum A; Arakawa Rinsan Co.) | 40 parts |
| | Calcium bicarbonate | 20 parts |
| | Toluene | 40 parts |
| (l) | Polyethylene (AC Polyethylene 629; Allied Chemical Co., Ltd.) | 10 parts |
| | Paraffin wax | 10 parts |
| | Nonylphenol ethylene oxide | 5 parts |
| | Water | 75 parts |
| (m) | Polyamide resin | 30 parts |
| | Polyethylene glycol No. 6000 | 5 parts |
| | Ethyl cellulose | 3 parts |
| | Toluene | 40 parts |
| | Ethanol | 22 parts |
| (n) | Picotex 120 (Esso Standard Petroleum Co., Ltd.) | 30 parts |
| | Stearic acid | 5 parts |
| | Ethyl cellulose | 3 parts |
| | Toluene | 62 parts |
| (o) | Polyvinyl alcohol (Gosenol CH-17; Japan Synthetic Chemical Industry Co.) | 5 parts |
| | Resorcine | 20 parts |
| | Ethanol | 15 parts |
| | Water | 60 parts |

In the case of using the (k) composition, there occurred pollution of the guide rolls and picking during the printing process and satisfactory printing was not attained. In the case of using the (l) and (o) compositions, the smoothness became bad on account of swelling of the paper in the coating process, and good printing was not achieved. Also, because of large shrinkage of the paper, precise pattern fitting was not successful. Further, on account of the slow drying, a long period of time was required. In the case of using the (m) and (n) compositions, there was no problem in the coating and printing steps. But a printed product obtained from a polyester cloth which was transfer-printed and subjected to fixing treatment and reducing washing treatment under the same conditions as in the method of the present invention, carried a part of the release layer composition used which remained adhering thereto, so that the hand became stiff and the air permeability was also considerably lowered. In a comparative example in which stearic acid was used in place of the 12-hydroxystearic acid in the release layer composition (i), stearic acid separated out during the coating step to make coating impossible.

EXAMPLE 6

| (p) Release layer composition | |
|---|---|
| Hydroxypropyl-methyl cellulose phthalate (HP-50; The Shin-etsu Chemical Industry Co.) | 10 parts |
| 12-Hydroxystearic acid | 15 parts |
| Toluene | 25 parts |
| Methanol | 30 parts |
| Isopropanol | 20 parts |
| (q) Printing ink composition | |
| Acid dye (Sumitomo Chemical Company Limited) | |
| Yellow ink: Aminyl Yellow F-5GL (C.I. Acid Yellow 127) | |
| Red ink: Aminyl Brilliant Red F-4B (C.I. Acid Red 247) | |
| Blue ink: Aminyl Sky Blue F-R (C.I. Acid Blue 112) | |
| Hydroxypropyl cellulose | 5 parts |
| Rosin-modified maleic acid resin (Malkyd -32; Arakawa Rinsan Co.) | 10 parts |
| Isopropanol | 35 parts |
| Methanol | 35 parts |

On a fine quality paper which had been surface-sized with polyvinyl alcohol and hot calender-finished as in Example 5, release layer formation and three color printing were performed continuously by a four color gravure printing machine, using the above-mentioned release layer composition (p) and three color inks (q), to prepare a transfer sheet. During the printing process, pollution of the guide rolls of the printing machine, deformation of the pattern and picking did not occur to allow excellent printing which was sharp at pattern edges and had a good printing effect at highlight portions. The transfer sheets, after storage for 6 months at room temperatures in the form of rolls, did not show any blocking phenomenon. A wool muslin was placed on the printed surface of this transfer sheet, and was passed between calender rolls heated to 140° C. under the conditions of 50 kg/cm$^2$ and 5 m/min. Upon leaving the calender, the fine quality paper and the wool fabric had been already separated from each other. The transfer efficiency of the ink was 92%. After the transfer-printed fabric was steamed at 100° C. for 60 minutes for dye fixation and color development, it was soaped with an aqueous solution composed of 1 g/l polyphosphoric acid and 2 g/l Amylasin at 60° C. for 10 minutes to dissolve and remove unfixed dyes and the release layer and ink binder, and then washed and dried. There was obtained a printed product which was sharp at pattern edges and splendid in tones and which was not impaired in hand.

EXAMPLE 7

| (r) Release layer composition | |
|---|---|
| Hydroxypropyl cellulose | 10 parts |
| 11-Hydroxypalmitic acid | 20 parts |
| Toluene | 20 parts |
| Methanol | 30 parts |
| Isopropanol | 20 parts |
| (s) Printing ink composition | |
| Basic dye (Hodogaya Chemical Co.) | 15 parts |
| Yellow ink: Aizen Catilon Brilliant Yellow (C.I. Basic Yellow 13) | |
| Red ink: Aizen Catilon Brilliant Pink BH (C.I. Basic Red 36) | |
| Blue ink: Aizen Catilon Pure Blue 5GH (C.I. Basic Blue 3) | |
| Hydroxypropyl cellulose | 5 parts |
| Rosin-modified maleic acid resin (Malkyd-32) | 10 parts |

-continued

| | |
|---|---|
| Isopropanol | 70 parts |

On a fine quality paper which had been surface-sized with polyvinyl alcohol and hot calender-finished, continuous (on-line printing) as in Example 5 was performed, using the above-mentioned release layer composition (r) and the three color inks (s), to prepare a transfer sheet. During the printing process, pollution of the guide rolls of the printing machine, deformation of the pattern and picking did not occur, to allow excellent printing which was sharp at pattern edges and had good printing effect at highlight portions. The transfer sheets, after storage for 6 months at room temperatures in the form of rolls, did not show any blocking phenomenon. A basic dyeable polyester texturized yarn woven fabric was placed on the printed surface of this transfer sheet and was passed between calender rolls heated to 130° C. at a pressure of 30 kg/cm² and at the rate of 5 m/min. Upon leaving the calender, the fine quality paper and the fabric had been already separated from each other. The transfer efficiency of the inks was 95%. After the transfer-printed fabric was steamed at 120° C. for 30 minutes to fix the dyes and to develop color, it was subjected to reducing washing with a solution of the same recipe as in Example 1 and washed with water and dried. There was obtained a printed product which was sharp at pattern edges and splendid in tones and which was not impaired in hand.

EXAMPLE 8

| (t) Release layer composition | |
|---|---|
| Copolymer of n-butyl acrylate/methyl methacrylate/methacrylic acid (20/65/15 mol %) | 10 parts |
| 12-Hydroxystearic acid | 15 parts |
| Toluene | 15 parts |
| Isopropanol | 20 parts |
| Methanol | 40 parts |

On a copy paper, a styrene-butadiene copolymer emulsion (Hycar LX 204; The Japan Geon Co.) was coated with a gravure coater so that the dry amount of coating was 0.5 g/m², and was then dried and passed between hot calender rolls to obtain a sized paper of excellent smoothness. On this sized paper, the above-mentioned release layer composition (t) was coated with a gravure coater so that the dry amount of coating was 3 g/m², and then dried. On this release layer, the following printing ink composition (u) was coated uniformly by the roll coating method so that the dry amount of coating was 10 g/m².

| (u) Printing ink composition | |
|---|---|
| Sumikaron Blue S-BG Conc. Cake (Sumitomo Chemical Company Limited; C.I. Disperse Blue 73) | 10 parts |
| Hydroxypropyl cellulose | 20 parts |
| Rosin-modified maleic acid resin (malkyd-32) | 10 parts |
| Isopropanol | 60 parts |

A polyester texturized yarn woven fabric was placed on this transfer sheet thus obtained, and transference, color development, reducing washing, water-washing and drying were performed in the same way as in Example 1.

EXAMPLE 9

| (v) Release layer composition | |
|---|---|
| Copolymer of acrylonitrile/ethyl acrylate/methacrylic acid (60/30/10 mol %) | 10 parts |
| 11-Hydroxypalmitic acid | 15 parts |
| Toluene | 20 parts |
| Methyl ethyl ketone | 15 parts |
| Isopropanol | 20 parts |
| Methanol | 20 parts |

In the same way as in Example 4, a polyvinyl alcohol-sized paper was prepared, on which the release layer composition (v) was coated by the gravure coat method so that the dry amount of coating was 3.5 g/m², and was then dried. A pattern was gravure-printed on this release layer with the following printing ink composition (w).

| (w) Printing ink composition | |
|---|---|
| Sumikaron Blue S-BG Conc. Cake (Sumitomo Chemical Company Limited; C.I. Disperse Blue 73) | 10 parts |
| Hydroxypropyl cellulose | 5 parts |
| Rosin-modified maleic acid resin (Malkyd-32[R]) | 10 parts |

A polyester texturized yarn fabric was placed on the transfer sheet thus obtained, and in the same way as in Example 1 transference, color development, reducing washing, water-washing and drying were performed. There was obtained a printed cloth which was sharp at pattern edges and was not impaired in hand.

EXAMPLE 10

| (x) Release layer composition | |
|---|---|
| Hydroxypropyl cellulose | 13 parts |
| Hydroxybenzoic acid-n-propyl ester | 13 parts |
| Isopropanol | 37 parts |
| Methanol | 37 parts |

The above-mentioned release layer composition (x) was coated uniformly on a glassine paper by the gravure coat method so that the dry amount of coating was 2.5 g/m². A pattern was gravure-printed on this release layer, using the printing ink (b) shown in Example 1. An acetate woven fabric was placed on this printed surface and was passed between calender rolls heated to 120° C. at a pressure of 10 kg/cm and at the rate of 5 m/min. to transfer the pattern. The transfer-printed cloth, after being steamed at 110° C. for 30 minutes, was soaped with an aqueous solution composed of 1 g/l sodium tripolyphosphate and 2 g/l Amylasin at 60° C. for 10 minutes, and was then washed with water and dried. There was obtained an acetate print which was sharp at pattern edges and not impaired in hand.

What is claimed is:

1. In a method of transfer printing which comprises forming a release layer on a temporary support; printing a pattern on said release layer with an ink containing coloring matter therein to obtain a transfer sheet; superposing an article to be transfer-printed on the printed surface of said transfer sheet; heating the superposed aggregate under pressure to transfer the release layer with the pattern onto said article to be transfer-printed; fixing the coloring matter to said article, and then soaping said article to remove the release layer; the improvement wherein the release layer consists essentially of 1. 10 to 90 weight percent of one or more thermoplastic polymers having excellent film-forming properties, water-solubility or alkaline water-solubility and organic solvent-solubility and having a softening point of between 60° and 200° C, said polymers being selected from the group consisting of hydroxypropyl cellulose, hydroxypropyl-hydroxyethyl cellulose, hydroxypropyl-methyl cellulose phthalate, hydroxypropyl-hydroxyethyl cellulose phthalate and vinyl copolymers consisting of an ethylenically unsaturated mono- or dicarboxylic acid and another ethylenically unsaturated monomer copolymerizable therewith and,
2 90 to 10 weight percent of one or more water-soluble or alkaline water-soluble and organic solvent-soluble oxycarboxylic acids and derivatives as plasticizers having a melting point between 30° and 120° C, said plasticizer being selected from the group consisting of 12-hydroxystearic acid, 2-hydroxypalmitic acid, 11-hydroxypalmitic acid, 14-hydroxypalmitic acid, 16-hydroxypalmitic acid, 2-hydroxytetradecanoic acid, 11-hydroxytetradecanoic acid, 2-hydroxydodecanoic acid, ω-hydroxylauric acid, 3,11-dihydroxytetradecanoic acid and 9,10-dihydroxyundecanoic acid.

2. The method as claimed in claim 1 wherein said thermoplastic polymers used in the release layer composition, are vinyl copolymers consisting of 5–20 mol %, of acrylic acid or methacrylic acid and 95–80 mol % of a copolymerizable ethylenically unsaturated monomer composed of an acrylic acid ester, methacrylic acid ester or mixtures thereof.

3. A method as in claim 2 wherein the acrylic acid or methacrylic acid is present in the copolymer in amounts of 10–15 mol % and the ethylenically unsaturated monomer is present in amounts of 90–85 mol %.

4. The method as claimed in claim 1 wherein the release layer is formed of a composition consisting of 30–90 weight percent of one or more thermoplastic polymers and 70–10 weight percent of one or more plasticizers.

5. The method as claimed in claim 4 wherein the release layer composition has a softening point between 50° and 150° C.

6. The method as claimed in claim 4, wherein the release layer composition has a softening point between 70° and 120° C.

7. The method as claimed in claim 1 wherein the temporary support is selected from the group consisting of papers, plastic films and metallic foils.

8. The method as claimed in claim 1 wherein the coloring matter is selected from the group consisting of acid dyes, acid mordant dyes, basic dyes, cationic dyes, direct dyes, naphthol dyes, vat dyes, sulfur dyes, reactive dyes and disperse dyes.

9. The method as claimed in claim 1 wherein a water-soluble or alkaline-water-soluble and organic-solvent-soluble thermoplastic polymer is used as a binder for the ink.

10. The method as claimed in claim 1 wherein the article to be transfer-printed is any of textile goods selected from the group consisting of woven fabric, knitted fabric, non-woven fabric, spun-bonded fabric and carpet or rug, composed of natural or regenerated cellulose fibers selected from the group consisting of cotton, hemp, rayon; protein fibers selected from the group consisting of wool and silk; cellulose acetate fibers; protein-acrylonitrile graft copolymer fibers; synthetic fibers selected from the group consisting of a polyester, polyamide, polyurethane, polyacrylonitrile and mixtures of these fibers; and sheet-shaped articles selected from the group consisting of films, boards, tapes, leathers and synthetic papers composed of resins selected from the group consisting of acetates, polyesters, polyamides, polyolefins and polyurethanes.

11. The method as claimed in claim 1 wherein the article to be transfer-printed placed on the printed surface of the transfer sheet is heated under pressure between calender rolls at a temperature between 80° and 180° C., at a pressure between 1 and 100 $kg/cm^2$, for a period of time from an instant to several seconds, to transfer the pattern onto the article to be transfer-printed.

12. A method according to claim 11 wherein the transfer sheet is heated between the calender rolls at a temperature between 100° and 150° C at a pressure of 50 $kg/cm^2$.

* * * * *